July 7, 1953 — S. S. ULRICH — 2,644,332
WEIGHT DISTRIBUTION TESTING APPARATUS
Filed Feb. 24, 1951 — 3 Sheets-Sheet 1
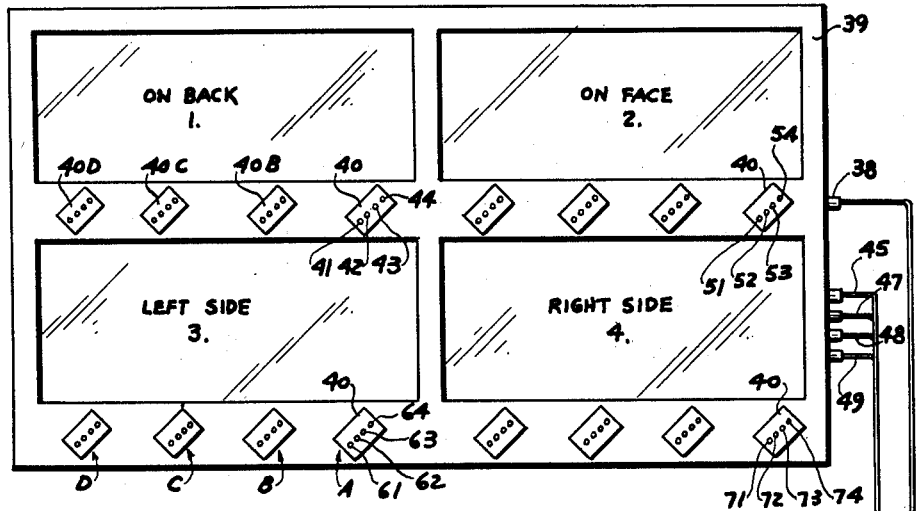
Fig. 1
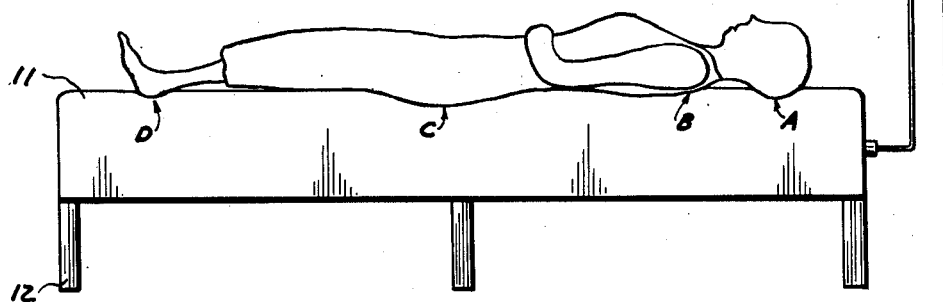
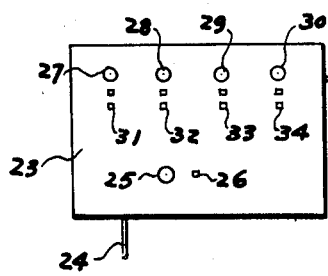
INVENTOR.
SANFORD S. ULRICH.
BY Robert A. Sloman
ATTORNEY.

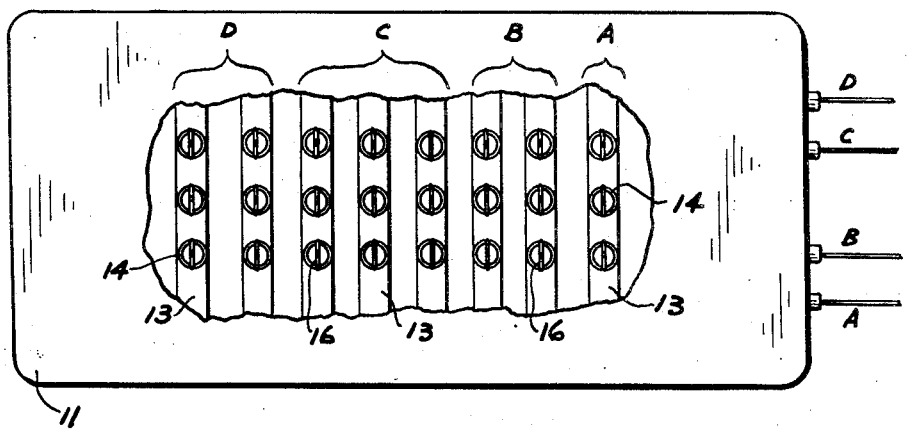
Fig. 2
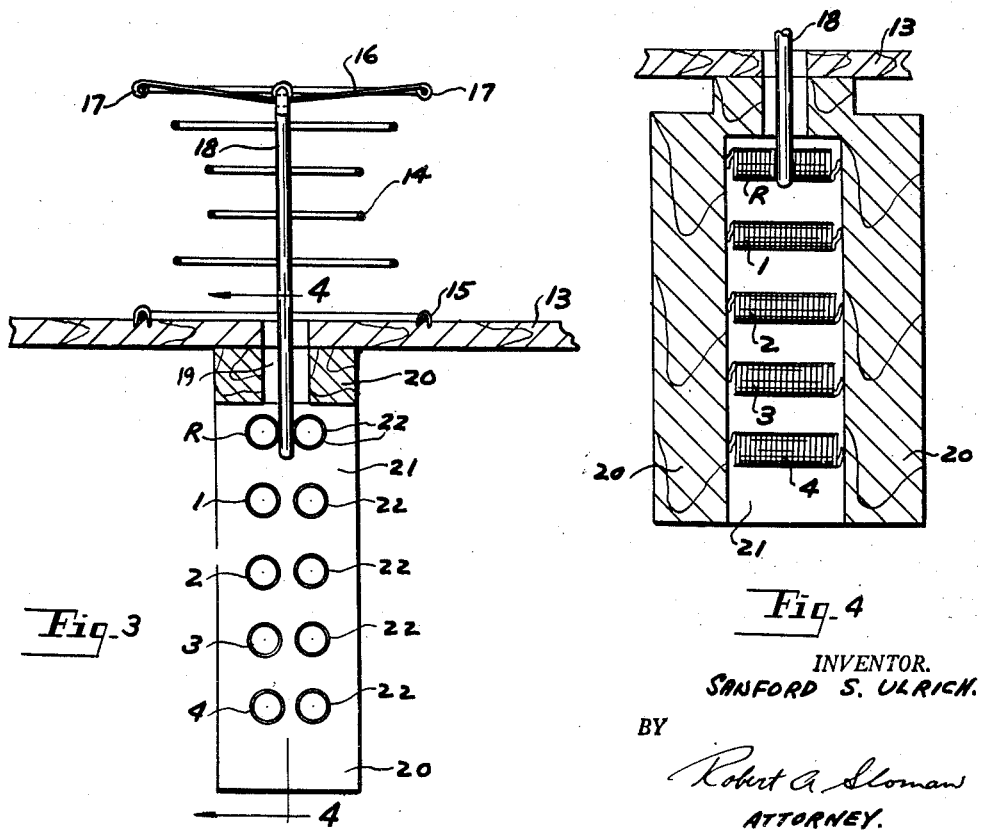
Fig. 3
Fig. 4
INVENTOR.
SANFORD S. ULRICH.
BY
Robert A. Sloman
ATTORNEY.

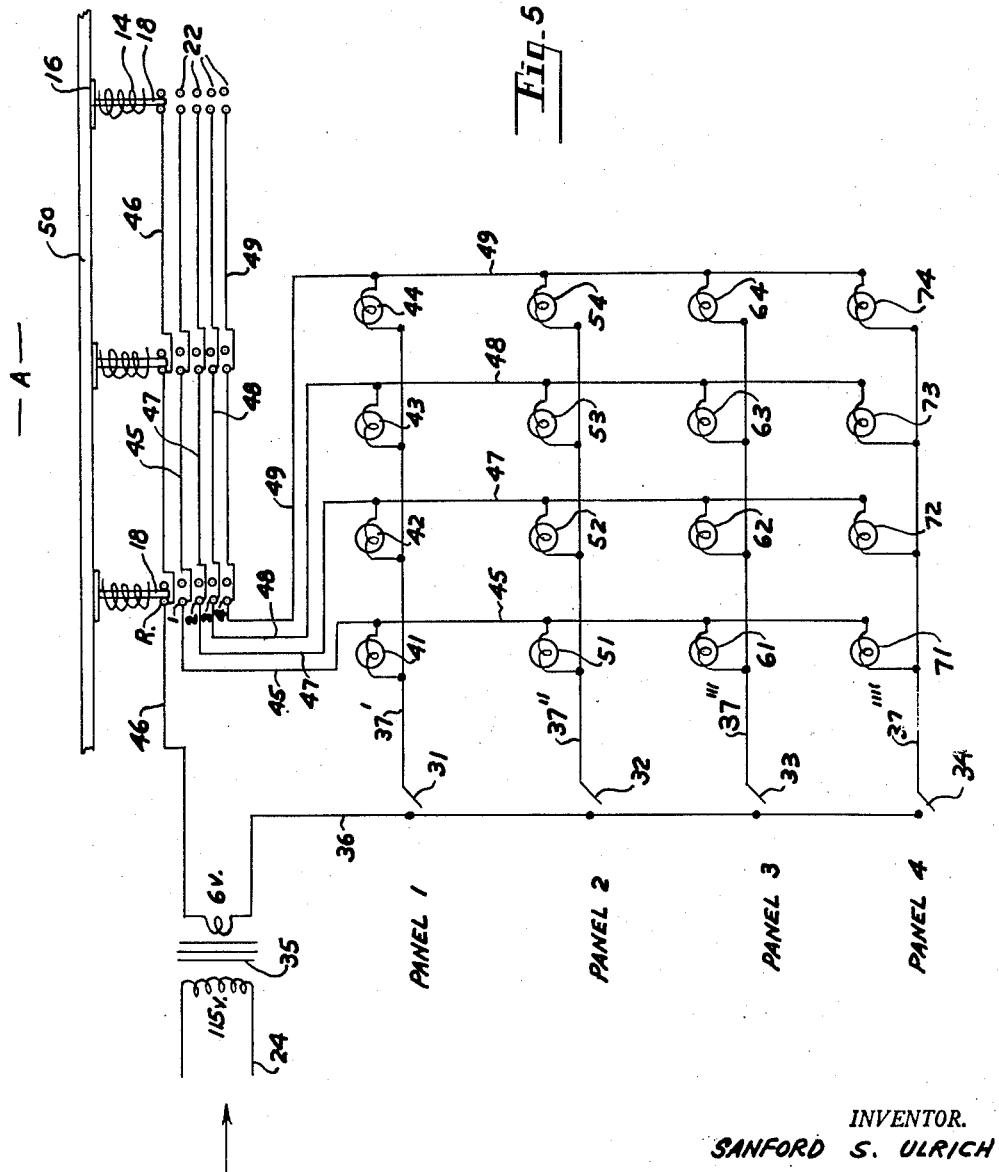

Patented July 7, 1953

2,644,332

UNITED STATES PATENT OFFICE 2,644,332

WEIGHT DISTRIBUTION TESTING APPARATUS

Sanford S. Ulrich, Detroit, Mich., assignor to Robinson Furniture Company, Detroit, Mich., a corporation of Michigan Application February 24, 1951, Serial No. 212,606

4 Claims. (Cl. 73—172)

This invention relates to an apparatus for the determination of body weight distribution in a horizontal plane. More particularly the device is adapted for visibly indicating the weight distribution of a person lying upon a mattress or other horizontal object in a predetermined position.

It is the object of the present invention to provide a weight measuring device which may be incorporated within a spring mattress construction and which includes switch elements controlled by the extent of downward flexing of a particular group of springs to thereby energize or close one or more switches in one or more electrical circuits which include bulbs to thereby visibly measure said weight distribution for a particular group of springs.

It is a further object of this invention to provide a weight distribution measuring apparatus wherein the coils of the supporting element, such as a mattress are divided into groups adjacent to the areas normally occupied by the head, the shoulders, the hips and the feet of a person lying in a horizontal position upon such mattress or support.

It is the still further object of this invention to incorporate a visible signal panel of four sections any one section of which may be energized by a suitable switch with said sections corresponding to various positions of testing such as "On the back," "On the face," "On the left side" and "On the right side."

It is the further object to provide a plurality of bulbs corresponding to a particular spring group, in turn corresponding to a particular body area such as the head, shoulders, hips or feet, and with the particular springs of a particular group controlling selectively a plurality of switches for successively closing a plurality of electrical circuits to energize one or more of the bulbs corresponding to a particular group as a visible measure of the person's weight for the corresponding body area.

These and other objects will be seen from the following specification and claims in conjunction with the appended drawings in which:

Fig. 1 is a side elevational view of the horizontal supporting and measuring apparatus together with an indicating panel electrically connected therewith.

Fig. 2 is a plan view of the horizontal supporting apparatus with the cover partly broken away illustrating the springs and their supports.

Fig. 3 is an elevational section showing the support for one spring and the switching mechanism secured to the spring and operable upon downward flexing movement thereof.

Fig. 4 is a section on line 4—4 of Fig. 3; and

Fig. 5 is a diagrammatic view illustrating the electrical connections between the panel bulbs corresponding to one of the spring groups.

It will be understood that the above drawings illustrate merely a preferred embodiment of the invention and that other embodiments are contemplated within the scope of the claims hereafter set out.

Referring to the drawings the horizontal testing apparatus is in the nature of a mattress construction 11 having a plurality of supporting legs 12. A plurality of parallel spaced transverse spring supports 13 are shown in Fig. 2 upon which are arranged a plurality of rows of upright coil springs, respectively secured to said supports as by the brads 15 or the like.

Cross strips 16 are supported upon the springs 14 at their upper ends and the downturned end portions 17 of strips 16 are suitably secured around the top coil of said springs as shown in Fig. 3. Each spring is provided with an upright electrically conductive shaft 18 which is secured at its upper end to the central portion of the cross strip 16 and depends downwardly through said springs respectively.

The lower ends of the shafts 18 project through central openings in the supports 13 and down through a central opening 19 in the rectangularly shaped switch supporting blocks 20 shown in Figs. 3 and 4.

There is provided a transverse upright slot 21 within each of the blocks 20 within which are supported a plurality of switch contacts R, 1, 2, 3 and 4 which are arranged horizontally and in vertically spaced relation, and which are connected in certain electrical circuits hereafter to be described with respect to Fig. 5.

As shown in Fig. 3 there are also provided a plurality of horizontally arranged coiled springs 22 which are spaced respectively from the springs R, 1, 2, 3 and 4, and which serve to cooperatively receive and bear against the contact shafts 18 to maintain the same in engagement with the respective switch elements R, 1, 2, 3 and 4. In the preferred embodiment illustrated in Figs. 3 and 4 the switch elements are in the form of coiled springs, however, it is contemplated that any other type of switch could be employed.

Referring to Fig. 1 the control panel 23 has a 115 volt inlet wire 24 and is connected with the switch diagrammatically shown at 26, which when "on" energizes the bulb 25. There are also four bulbs 27, 28, 29 and 30 and a plurality of separate corresponding "on" and "off" switches 31, 32, 33 and 34 which respectively control selectively any one of the four panels "On back," "On face," "Left side" or "Right side" designated in Fig. 1.

The control panel includes a suitable transformer 35 reducing the voltage to six volts for illustration which current is delivered to the wire 36 for selective connection to any one of the four bulb circuits 37', 37'', 37''' and 31'''', as shown in Fig. 5.

Referring to Fig. 2, and in the preferred embodiment there is shown preferably twenty-four coils of springs 14 which are employed to register the weight distribution of a person lying on the apparatus. The twenty-four coils are arranged in eight transverse rows of three each. Starting from one end of the horizontal support 11 the first three coil springs will register the weight of the head area and are generally designated by the letter A as being one particular group.

The next six coils register the shoulder area weight and are designated by the letter B. The next nine coils register the hip area and are designated by the letter C; and the last six coils register the foot portion area of the individual and are designated by the letter D. Thus there are provided four groups of upright springs A, B, C and D, each group of which will indicate visibly by a series of bulbs upon the panels 40 shown in Fig. 1 the particular weight distribution of a person for any one of four lying positions.

The four wires 37', 37'', 37''' and 37'''' are included within the conduit 37 which is shown in Fig. 1 and leads from control panel 23 to the indicating panel 39 and are joined thereto as at point 38. This latter panel 39 is divided into four areas designated "On back," "On face," "Left side" and "Right side," and upon the actuation of one of the four switches 31, 32, 33 or 34 shown in Figs. 1 and 5, any one of the four above described visible panels will be energized. For each visible panel there are provided therebelow a plurality of spaced bulb enclosing sections 40, 40B, 40C and 40D. There are provided within each section a row of four bulbs which, for illustration, in section 40 of the "On back" panel are designated by the numbers 41, 42, 43 and 44. For the "On face" panel these bulbs are designated by the numerals 51, 52, 53 and 54. For the "Left side" panel the corresponding bulbs are designated by the numbers 61, 62, 63 and 64; and for the "Right side" panel the corresponding bulbs are designated by the numerals 71, 72, 73 and 74.

The wiring diagram shown in Fig. 5 designates the above described bulbs all of which correspond to the group A of the coiled springs and which are energized by the three shafts 18, or any one of them, which are shown in Fig. 5.

The particular wiring diagram is illustrative of the electrical circuits between a particular group of coiled springs for a particular area such as any one of the groups A, B, C and D. Naturally one panel such as the "On back" panel could be employed for giving visible signals of the amount of weight distribution for a particular group of springs for the reason that it would be merely necessary for the person to change from one position to the other. In that case it would not be necessary to selectively operate the separate switches 31, 32, 33 and 34.

However in the preferred embodiment four such panels are employed which necessitates the use of the switches 31, 32, 33 or 34 to energize a particular panel.

As above described the four testing areas or measuring areas A, B, C and D correspond to the similarly named spring groups designated in Fig. 2. For the purpose of this application Fig. 5 is a diagrammatic illustration of merely the electrical circuits employed with respect to the group A sections and the particular group of springs which control the corresponding set of bulbs for that particular group.

The illustration of electrical circuits for the remaining groups would be exactly the same as that shown in Fig. 5 with the exception that for group B there would be shown six contact shafts 18; for group C, nine contact shafts and for group D six contact shafts.

Referring to Fig. 5 the capital A designation at the top diagrammatically shows the three switch operating shafts 18 corresponding to the three springs in group A, and for each spring there is provided adjacent and therebelow the five switch elements designated as R, 1, 2, 3 and 4.

The primary circuit through the wire 36, switch 31, lead 37' and bulb 41, wire 45 goes to the switch contact 1 and upon downward movement of shaft 18 engaging the switch 1 the electrical circuit is completed through the return wire 46. In view of the interconnection of the wire 45 between the three corresponding switches 1 for the three control shafts 18, it is apparent that any one of said shafts can close the electrical circuit so as to energize bulb 41, and this because the three switches 1 are in a parallel circuit.

It is apparent that upon an additional predetermined downward movement of any one or all of the shafts 18 so as to engage the switch 2 it will be seen that bulb 42 will be additionally illuminated with the circuit for said bulb running through the lead 37', the bulb 42, lead 47, switch 2, shaft 18 and the return lead 46. Here also the corresponding three switches 2 are similarly interconnected in a parallel circuit so that any one of the switches 2, if closed, would cause illumination of bulb 42.

Further predetermined downward movements of any one of the shafts 18 will effect contact with the switches 3 which through the leads 37', 48 and return lead 46 cause the additional illumination of bulb 43. And by a similar process a further downward predetermined movement of any one of the shafts 18 into contact with switch 4 will cause illumination of bulb 44 through the leads 37', 49 and return lead 46.

Having described my invention reference should now be had to the claims which follow for determining the scope thereof.

I claim:

1. In a device for visibly indicating the weight distribution of a person lying upon a mattress in a predetermined position, a mattress, an upright coiled spring immovably supported at its lower end within said mattress, an upright vertically movable conductive shaft within said spring and suspended at its upper end from the upper end of said spring and movably responsive to a load upon said spring, a normally open electrical circuit including a bulb and joined to a source of electricity, an open switch in said circuit spaced from below said shaft and adapted to be engaged by said shaft upon a predetermined downward movement thereof for closing said circuit, a branch circuit connected in parallel to said first circuit and including a second bulb, and a second open switch in said branch circuit spaced from and below said shaft and adapted to be engaged by said shaft upon a further predetermined downward movement thereof whereby said first circuit and said branch circuit are closed.

2. In a device for visibly indicating the weight distribution of a person lying upon a mattress in a predetermined position, a mattress, an upright coiled spring immovably supported at its lower end within said mattress, an upright vertically movable conductive shaft within said spring and suspended at its upper end from the upper end of said spring and movably responsive to a load upon said spring, a normally open electrical circuit including a bulb and joined to a source of electricity, an open switch in said circuit spaced from and below said shaft and adapted to be engaged by said shaft upon a predetermined downward movement thereof for closing said circuit, and a plurality of branch circuits connected in parallel to said first circuit, each branch circuit including a bulb, and an open switch in each branch circuit spaced at progressively increased distances from and below said shaft and adapted to be successively engaged by said shaft upon further predetermined downward movements thereof for successively closing said branch circuits depending upon the load applied to said spring.

3. In a device for visibly indicating the weight distribution of a person lying upon a mattress in a predetermined position, a mattress, a plurality of spaced upright coiled springs immovably supported at their lower ends with said mattress, an upright vertically movable conductive shaft within each spring and suspended at its upper end from the upper end of each spring, and variably movable responsive to a load upon said springs depending upon the distribution of said load thereon, a normally open electrical circuit including a bulb and joined to a source of electricity, a plurality of open switches in parallel connection in said circuit spaced from and below each of said shafts respectively, whereby a predetermined downward movement of at least one of said shafts will engage a switch for closing said circuit, and a plurality of branch circuits connected in parallel to said first circuit, each branch including a bulb, and a plurality of open switches connected in parallel with each of said branch circuits spaced respectively at successively increased distances from each of said shafts respectively, equally spaced respectively from the corresponding open switch of said first circuit, whereby a predetermined downward movement of at least one of said shafts will engage a switch in said first circuit closing the same, and successive increased predetermined downward movements of at least one of said shafts will progressively close said branch circuits to energize the bulbs therein depending upon the load upon said springs.

4. In a device for visibly indicating the weight distribution of a person lying upon a mattress in a predetermined position, a mattress, a plurality of spaced upright coiled springs immovably supported at their lower ends within said mattress and arranged throughout the central portions thereof, said springs being arranged in groups throughout the length of said mattress to register the weight distribution respectively of the head, shoulder, hip and foot areas of said person, a plurality of bulbs arranged in a plurality of groups corresponding to the group arrangement of said springs, to visibly measure the amount of weight in a particular spring group by the number of bulbs illuminated in a bulb group, an upright conductive shaft within each spring and suspended at its upper end from the upper end of said spring, an electrical circuit for each group of springs, each circuit including one of said bulbs of a particular bulb group, and a plurality of open switches connected in parallel in said circuit, corresponding to and respectively spaced from and below the spring shafts of said group, whereby a predetermined downward movement of at least one of said shafts will engage a switch for closing said circuit, and a plurality of branch circuits connected in parallel to said first circuit, each branch circuit including an other of the bulbs from one of the groups of bulbs, and a plurality of open switches connected in parallel with each of said branch circuits spaced respectively at successively increased distances from and below each of said shafts respectively, equally spaced respectively from the corresponding open switch of said first circuit, whereby a predetermined downward movement of at least one of said shafts with a particular group will engage a switch in said first circuit for closing the same, and successive increased predetermined downward movements of at least one of said shafts in a particular spring group will progressively close said branch circuits to energize the bulbs therein depending upon the load upon said springs.

SANFORD S. ULRICH.

References Cited in the file of this patent

UNITED STATES PATENTS

| Number | Name | Date |
|---|---|---|
| 532,868 | Bull | Jan. 22, 1895 |
| 2,249,645 | Applegarth | July 15, 1941 |
| 2,327,829 | Sternberg et al. | Aug. 24, 1943 |
| 2,378,039 | Schenker | June 12, 1945 |
| 2,572,521 | Rogers | Oct. 23, 1951 |